(12) United States Patent
Stryker et al.

(10) Patent No.: US 11,231,084 B2
(45) Date of Patent: Jan. 25, 2022

(54) FOLDABLE FLYWHEEL MECHANISM TO FACILITATE ENERGY GENERATION

(71) Applicant: Martin W. Stryker, Kalamazoo, MI (US)

(72) Inventors: Martin W. Stryker, Kalamazoo, MI (US); James T. Thwaites, Delton, MI (US); Scott J. Davis, Kalamazoo, MI (US)

(73) Assignee: Martin W. Stryker, Kalamazoo, MI (US)

( * ) Notice: Subject to any disclaimer, the term of this patent is extended or adjusted under 35 U.S.C. 154(b) by 582 days.

(21) Appl. No.: 16/202,739

(22) Filed: Nov. 28, 2018

(65) Prior Publication Data

US 2019/0178337 A1    Jun. 13, 2019

Related U.S. Application Data

(60) Provisional application No. 62/597,523, filed on Dec. 12, 2017.

(51) Int. Cl.
*F03G 3/08* (2006.01)
*F16F 15/31* (2006.01)
*F16F 15/315* (2006.01)

(52) U.S. Cl.
CPC ............. *F16F 15/31* (2013.01); *F03G 3/08* (2013.01); *F16F 15/315* (2013.01)

(58) Field of Classification Search
CPC ........... F03G 3/08; F16F 15/31; F16F 15/315; F03D 3/0005; F03D 3/065; H02K 7/02; H02K 7/025
See application file for complete search history.

(56) References Cited

U.S. PATENT DOCUMENTS

| | | | |
|---|---|---|---|
| 3,918,839 A * | 11/1975 | Blackwell | F03D 3/065 416/175 |
| 4,341,001 A | 7/1982 | Swartout | |
| 4,926,107 A | 5/1990 | Pinson | |
| 5,269,197 A | 12/1993 | Yang | |
| 7,049,708 B2 | 5/2006 | Hartman et al. | |
| 8,011,736 B2 | 9/2011 | Tan | |
| 8,056,914 B2 | 11/2011 | Kalil | |
| 8,368,272 B1 | 2/2013 | Petersen | |
| 8,371,659 B2 | 2/2013 | Fitzsimons | |
| 8,373,368 B2 * | 2/2013 | Achiriloaie | F03G 3/08 318/161 |

(Continued)

*Primary Examiner* — Luis A Gonzalez
(74) *Attorney, Agent, or Firm* — Price Heneveld LLP

(57) ABSTRACT

A utility power generator includes a flywheel that includes an outer perimeter that is operable between a planar position and a plurality of sinusoidal positions. A hub is concentrically positioned within the flywheel, wherein the hub defines a rotational axis of the flywheel. An axial fitting traverses relative to the hub and along the rotational axis in an axial direction as the flywheel operates between the planar position and the plurality of sinusoidal positions. The flywheel, the hub and the axial fitting are rotationally linked to synchronously rotate about the rotational axis. Rotation of the flywheel biases the axial fitting toward the planar position. A transfer fitting is coupled to at least one of the flywheel, the hub and the transfer fitting. Rotation of the flywheel about the rotational axis operates the transfer fitting to operate a tool.

20 Claims, 14 Drawing Sheets

(56) References Cited

U.S. PATENT DOCUMENTS

| | | |
|---|---|---|
| 8,678,520 B2 | 3/2014 | Sheu et al. |
| 8,803,487 B2 | 8/2014 | Dehlsen et al. |
| 8,833,864 B2 | 9/2014 | Solheim et al. |
| 9,534,588 B2 | 1/2017 | Huang et al. |
| 9,562,393 B2 | 2/2017 | Renouard et al. |
| 9,759,194 B2 | 9/2017 | Tucciarone |
| 2005/0188783 A1 | 9/2005 | Stanimirovic |
| 2009/0033182 A1 | 2/2009 | Lee |
| 2010/0207452 A1 | 8/2010 | Saab |
| 2014/0097666 A1 | 4/2014 | Fitzsimons et al. |
| 2014/0103760 A1 | 4/2014 | Dugas |
| 2016/0094107 A1 | 3/2016 | Riddiford et al. |
| 2016/0201643 A1 | 7/2016 | Blake |
| 2017/0047810 A1 | 2/2017 | Riddiford et al. |

\* cited by examiner

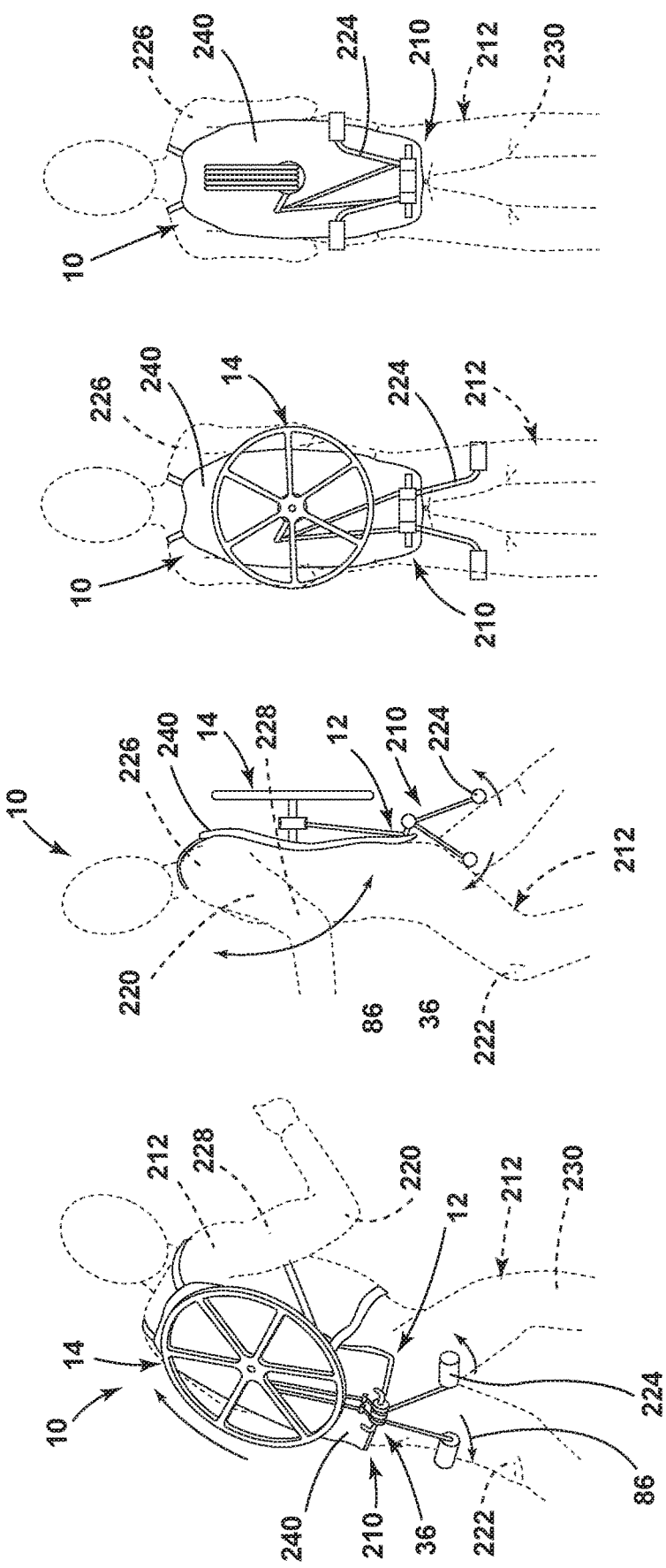

FOLDABLE FLYWHEEL MECHANISM TO FACILITATE ENERGY GENERATION

CROSS-REFERENCE TO RELATED APPLICATION

This application claims priority to and the benefit under 35 U.S.C. § 119(e) of U.S. Provisional Patent Application No. 62/597,523, filed on Dec. 12, 2017, entitled FOLDABLE FLYWHEEL MECHANISM TO FACILITATE ENERGY GENERATION, the entire disclosure of which is hereby incorporated herein by reference.

FIELD OF THE INVENTION

The present invention generally relates to flywheels, and more specifically, a collapsible flywheel that can be used in conjunction with a transfer fitting that is adapted to convert rotational operation of the flywheel into usable energy for powering a fueled tool or other working device.

BACKGROUND OF THE INVENTION

Outdoor activities such as hiking, rafting, camping, and other extended outdoor activities are being conducted in conjunction with electronic devices and other modern technology to assist in wayfinding, communicating locations and other communicative purposes. Using technology for allowing for modern conveniences during these outdoor excursions is becoming more and more prevalent. Additionally, military personnel can also take advantage of modern conveniences and modern technology while separated from a home base or out in the field.

SUMMARY OF THE INVENTION

According to one aspect of the present invention, a utility power generator includes a flywheel that includes an outer perimeter that is operable between a planar position and a plurality of sinusoidal positions. A hub is concentrically positioned within the flywheel, wherein the hub defines a rotational axis of the flywheel. An axial fitting traverses relative to the hub and along the rotational axis in an axial direction as the flywheel operates between the planar position and the plurality of sinusoidal positions. The flywheel, the hub and the axial fitting are rotationally linked to synchronously rotate about the rotational axis. Rotation of the flywheel biases the axial fitting toward the planar position. A transfer fitting is coupled to at least one of the flywheel, the hub and the transfer fitting. Rotation of the flywheel about the rotational axis operates the transfer fitting to operate a tool.

According to another aspect of the present invention, a utility power generator includes a collapsible flywheel that is operable between a collapsed position, a sinusoidal position and a planar position. A rotational shaft extends at least partially through the collapsible flywheel and defines a rotational axis of the collapsible flywheel. An axial fitting that traverses along the rotational shaft in an axial direction as the collapsible flywheel operates between the collapsed, sinusoidal and planar positions. A plurality of spokes extend between the axial fitting and the collapsible flywheel. Rotation of the collapsible flywheel about the rotational axis biases the axial fitting along the rotational shaft and toward the planar position.

According to another aspect of the present invention, a method of harnessing movement energy for operating a tool positioning a flywheel having a hub and an axial fitting in one of a sinusoidal position and a planar position. The flywheel, the hub and the axial fitting rotate about a rotational axis and the axial fitting is biased toward the planar position during rotation of the flywheel. A transfer fitting is coupled to one of the flywheel, the hub and the axial fitting. The flywheel is rotated by harnessing at least one of wind, water, gravity and body movement. Rotation of the flywheel causes a rotation of the transfer fitting. A field mechanism is operated via the transfer fitting, wherein rotation of the flywheel operates a field tool.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 17 is a perspective view of an aspect of the utility power generator shown incorporated within a wearable member for harnessing body movement;

FIGS. 18-20 are schematic elevational views of the utility power generator of FIG. 17 shown in various use and stowed positions;

DETAILED DESCRIPTION OF THE PREFERRED EMBODIMENTS

Figure 1:
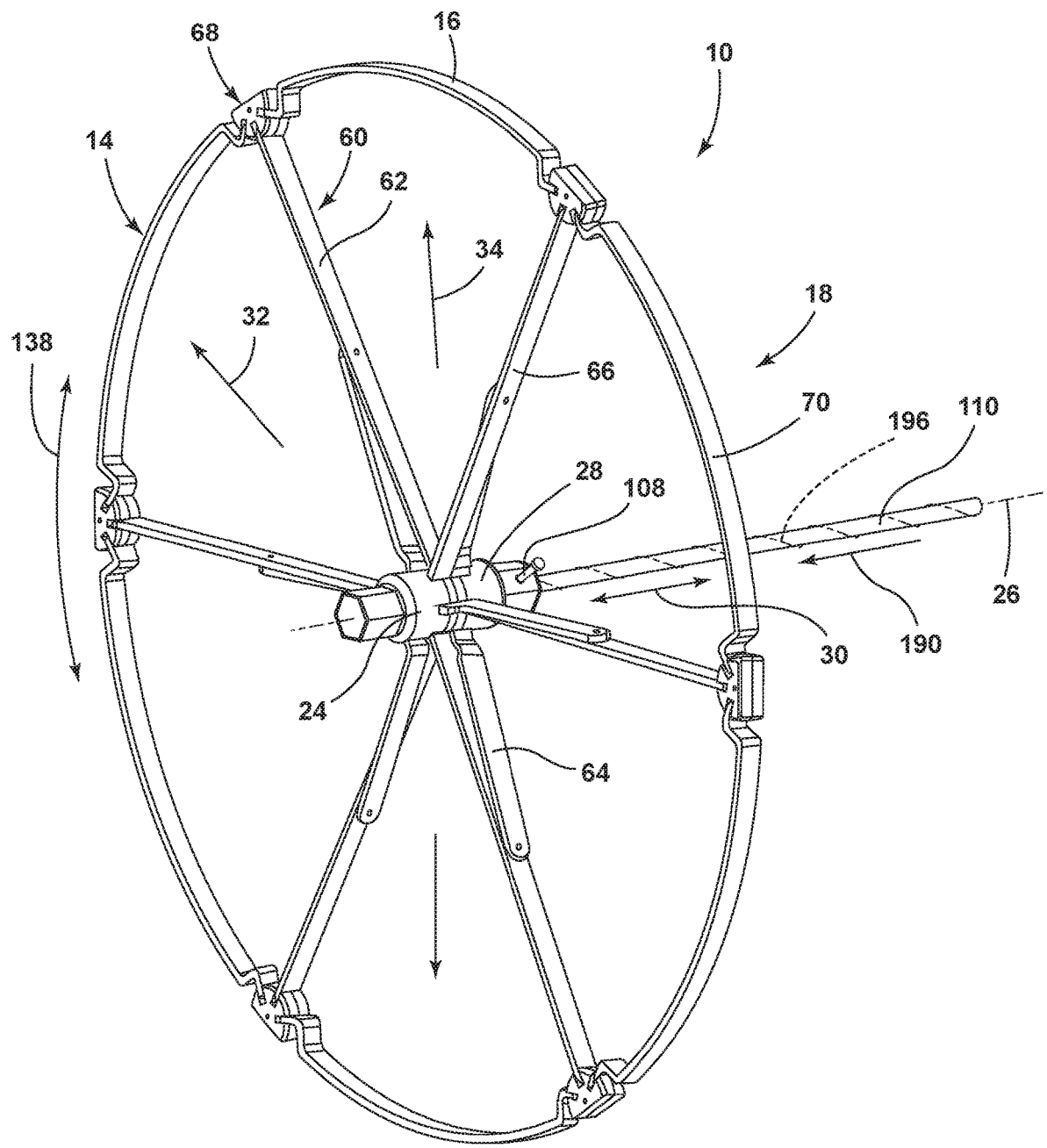
FIG. 1 is a perspective view of an aspect of the utility power generator shown in a planar position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
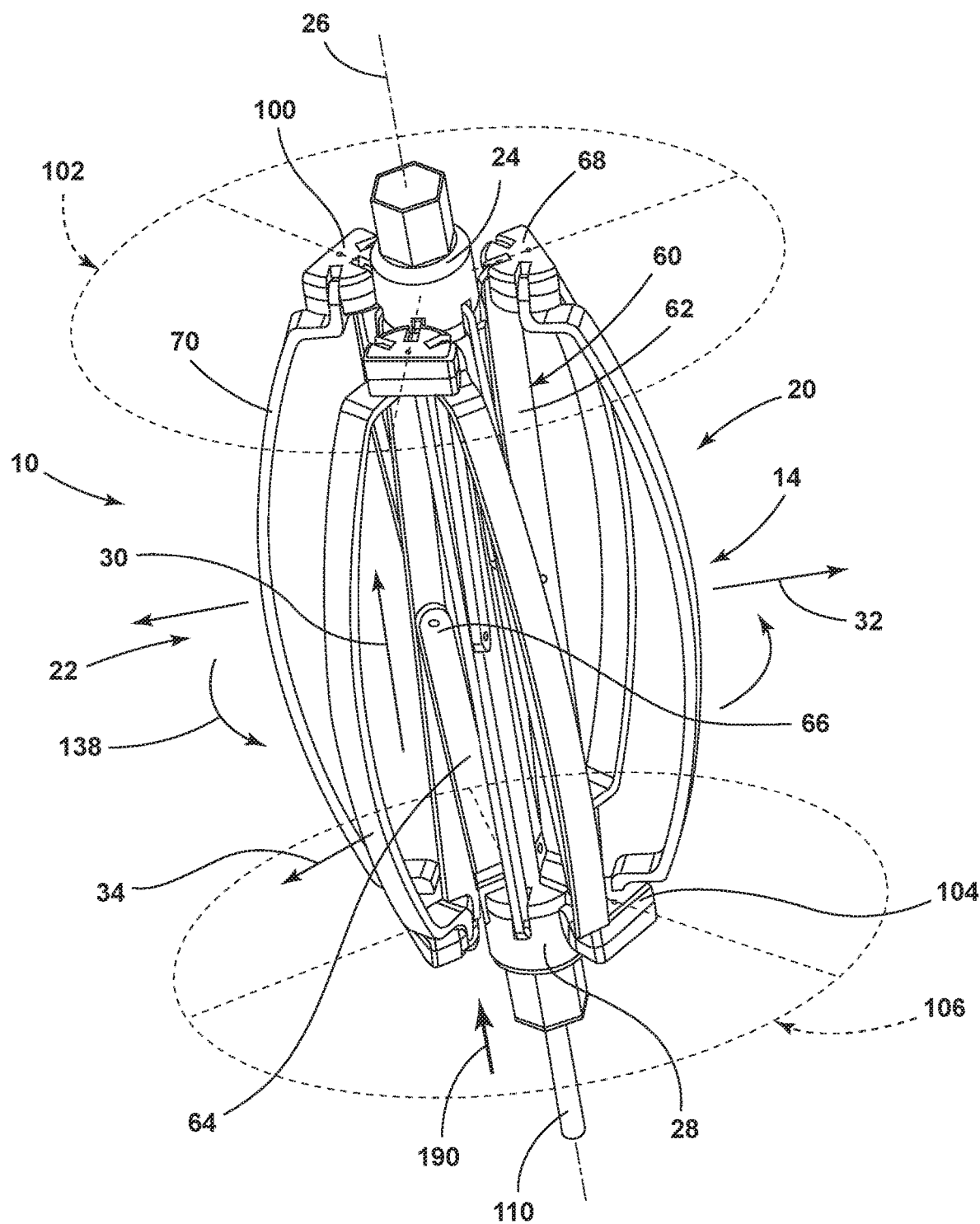
FIG. 2 is a perspective view of the utility power generator of FIG. 1 shown in one of the sinusoidal positions or a collapsed position.
Figure 3:
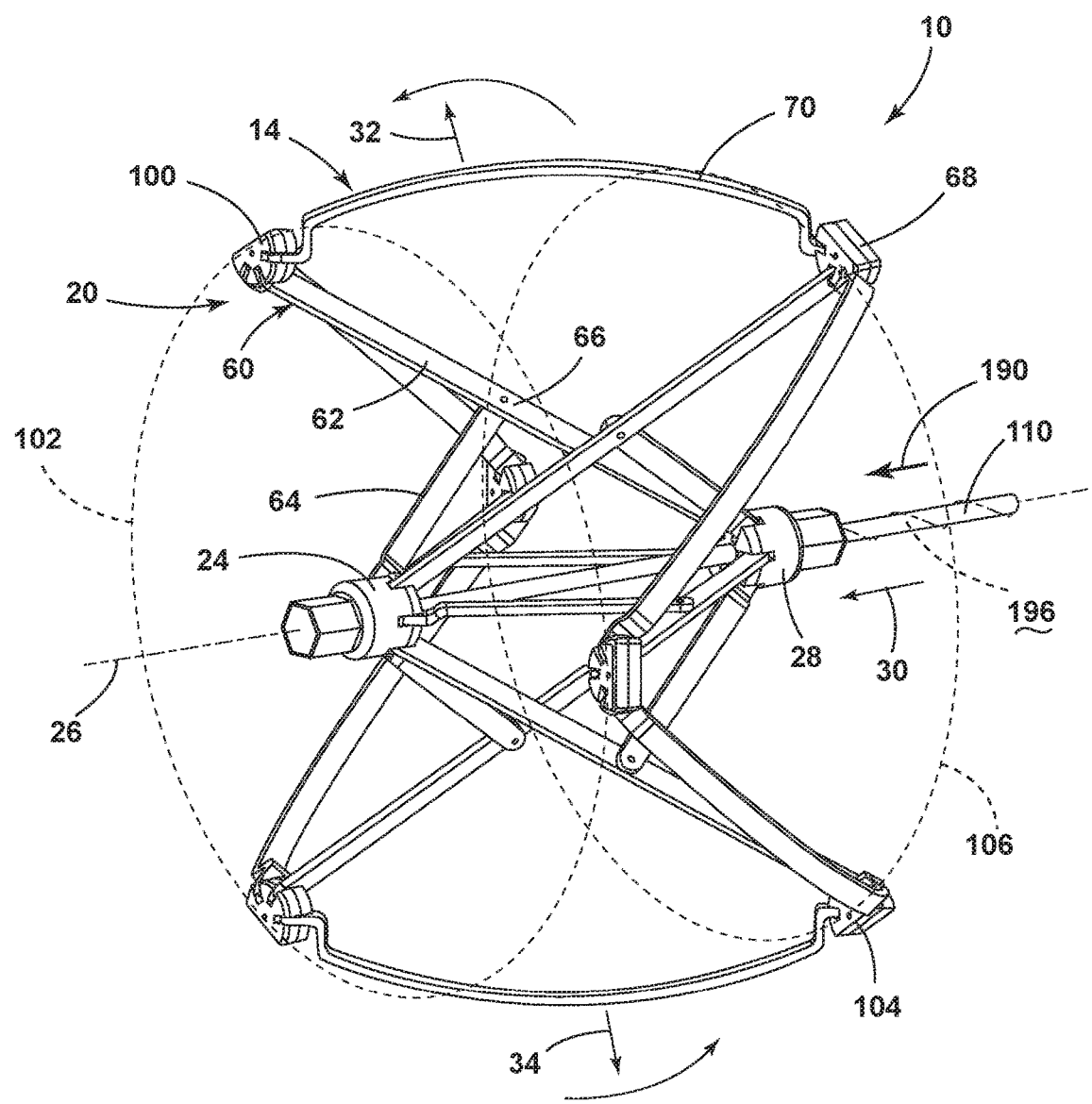
FIG. 3 is a perspective view of the utility power generator of FIG. 2 shown in another sinusoidal position.

As exemplified in FIGS. 1-3, reference numeral 10 generally refers to a utility power generator for harnessing an external movement that can be transferred into rotational energy 138 for operating a field tool 12 or other device. According to various aspects of the device, the utility power generator 10 includes a flywheel 14 having an outer perimeter 16 that is operable between a planar position 18 and a plurality of sinusoidal positions 20. One of the sinusoidal positions 20 can take the form of a collapsed position 22 where the flywheel 14 is folded into a compact form. The utility power generator 10 also includes a hub 24 that is concentrically positioned within the flywheel 14. The hub 24 is adapted to define a rotational axis 26 of the flywheel 14. An axial fitting 28 is configured to traverse along the rotational axis 26 relative to the hub 24 and typically in an axial direction 30. The axial fitting 28 moves along the rotational axis 26 as the collapsible flywheel 14 operates between a planar position 18 and the plurality of sinusoidal positions 20. In this manner, when the flywheel 14 is in the planar position 18, the axial fitting 28 is in substantial engagement with the hub 24. Conversely, when the collapsible flywheel 14 is in the collapsed position 22, the axial fitting 28 is moved in the axial direction 30 a predetermined distance away from the hub 24.

Referring again to FIGS. 1-3, it is contemplated that the flywheel 14, the hub 24 and the axial fitting 28 are rotationally linked to synchronously rotate about the rotational axis 26. Rotation of the flywheel 14 serves to bias the axial fitting 28 towards the planar position 18. In this manner, as the flywheel 14 rotates about the rotational axis 26, centrifugal force 32 generated by the flywheel portions 70 of the flywheel 14 bias the flywheel portions 70 in an outward direction 34. As the flywheel portions 70 are biased in the outward direction 34, the axial fitting 28 is biased or tended in the axial direction 30 and toward an engagement with the hub 24 to define 122 the planar position 18. A transfer fitting 36 is coupled to at least one of the flywheel 14, the hub 24 and the transfer fitting 36. According to various aspects of the device, rotation of the flywheel 14 about the rotational axis 26 serves to operate the transfer fitting 36 to operate the tool 12.

Referring now to FIGS. 1-21, it is contemplated that the transfer fitting 36 is a rotationally operable tool 12. The tool 12 can take the form of various instruments, mechanical devices 48 or other working device. The tool 12 can also take the form of a rotationally operable electric rotor 50 that is configured to operate or generate power for a working device or for storing electrical power. The working device can include any one of various devices that can include, but are not limited to, water filter 52, an electric generator, an air pump, a desalinization mechanism, a light fixture, an electrical beacon, a cutting tool 12, and other similar devices, as will be described more fully below.

Referring again to FIGS. 1-3, the utility power generator 10 includes the collapsible flywheel 14 that is attached to each of the hub 24 and the axial fitting 28 by a plurality of spokes 60. The plurality of spokes 60 serve to extend between the axial fitting 28 and the collapsible flywheel 14, wherein the rotation of the collapsible flywheel 14 about the rotational axis 26 biases the axial fitting 28 along the rotational shaft 110 and toward the planar position 18. Each spoke 60 can include a primary linkage 62 that extends from, typically, the hub 24 and to a portion of the collapsible flywheel 14. A minor linkage 64 extends from the axial fitting 28 into a medial portion 66 of the primary linkage 62. It should be understood that the placement of the primary linkage 62 and the minor linkage 64 can be switched between the hub 24 and the axial fitting 28. To receive the components of each spoke 60, the collapsible flywheel 14 includes corresponding joints 68 that receive adjacent flywheel portions 70 and also receive a portion of the spoke 60. The spoke 60 and the adjacent flywheel portions 70 are rotationally operable with respect to the joint 68. In this manner, the joint 68 can provide for axial movement of the axial fitting 28 between the planar and sinusoidal positions 18, 20 of the utility power generator 10.

By placing the collapsible flywheel 14 in the planar position 18 or one of the sinusoidal positions 20, the collapsible flywheel 14 can harness any one of various moving media 80 in the form of wind 82, moving water 84, gravity, body movement 86, combinations thereof and other similar moving media 80.

Referring again to FIGS. 1-3, movement of the collapsible flywheel 14 between planar and sinusoidal positions 20 is accomplished by extending the axial fitting 28 along the rotational axis 26 and away from the hub 24. As the axial fitting 28 is moved away from the hub 24, a portion of the joints 68 are maintained at a substantially consistent level even with the hub 24. Accordingly, these hub joints 100 and the hub 24 define a substantially consistent first plane 102 extending perpendicular through the rotational axis 26. The other portion of the joints 68 tend to follow the movement of the axial fitting 28 as it moves away from the hub 24. Accordingly, the axial fitting 28 and the fitting joints 104 form a second plane 106 that also extends perpendicular to the rotational axis 26. As the hub joints 100 stay generally even with the hub 24 and the fitting joints 104 move along with the axial fitting 28, the flywheel 14 portions tend to form a sinusoidal configuration of the collapsible flywheel 14. Typically, the collapsible flywheel 14 will include six individual flywheel portions 70. Each individual flywheel portion 70 is attached to one hub joint 100 as well as one fitting joint 104. It is contemplated that the axial fitting 28 can include a locking mechanism 108, such as a thumb screw or other similar locking mechanism 108, that can attach to a rotational shaft 110 that extends from the hub 24 and through the axial fitting 28. By using the locking mechanism 108, the axial fitting 28 can be attached to the rotational shaft 110 to set the collapsible flywheel 14 in the planar position 18 or one of the sinusoidal positions 20. As will be described more fully below, the use of the collapsible flywheel 14 in a planar position 18 or one of the sinusoidal positions 20 can be used to harness different types of movement energy from a moving media 80 for transferring this energy for operating one of the tools 12.

Figure 4:
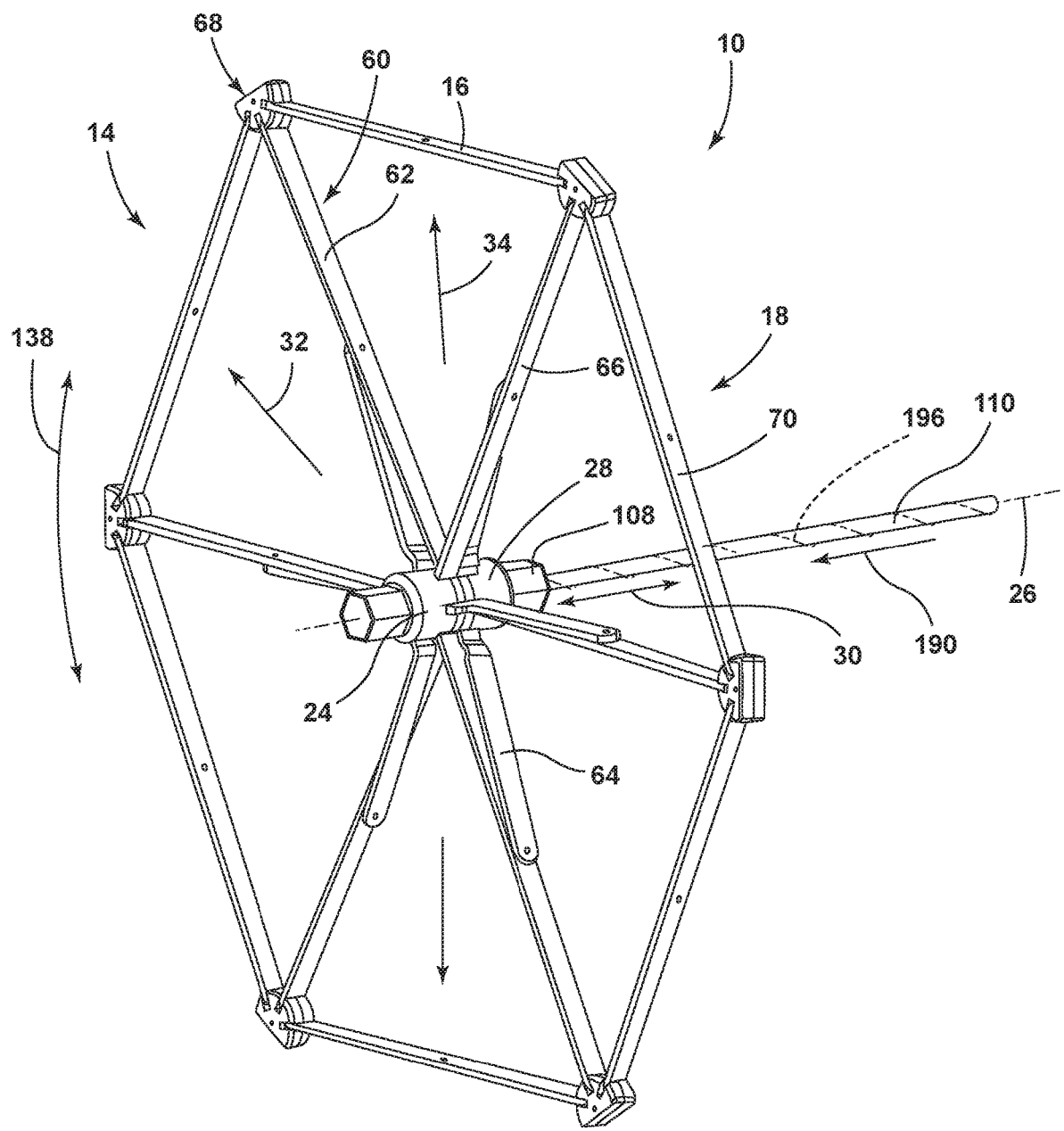
FIG. 4 is a perspective view of an aspect of the utility power generator shown in the planar position.
Figure 5:
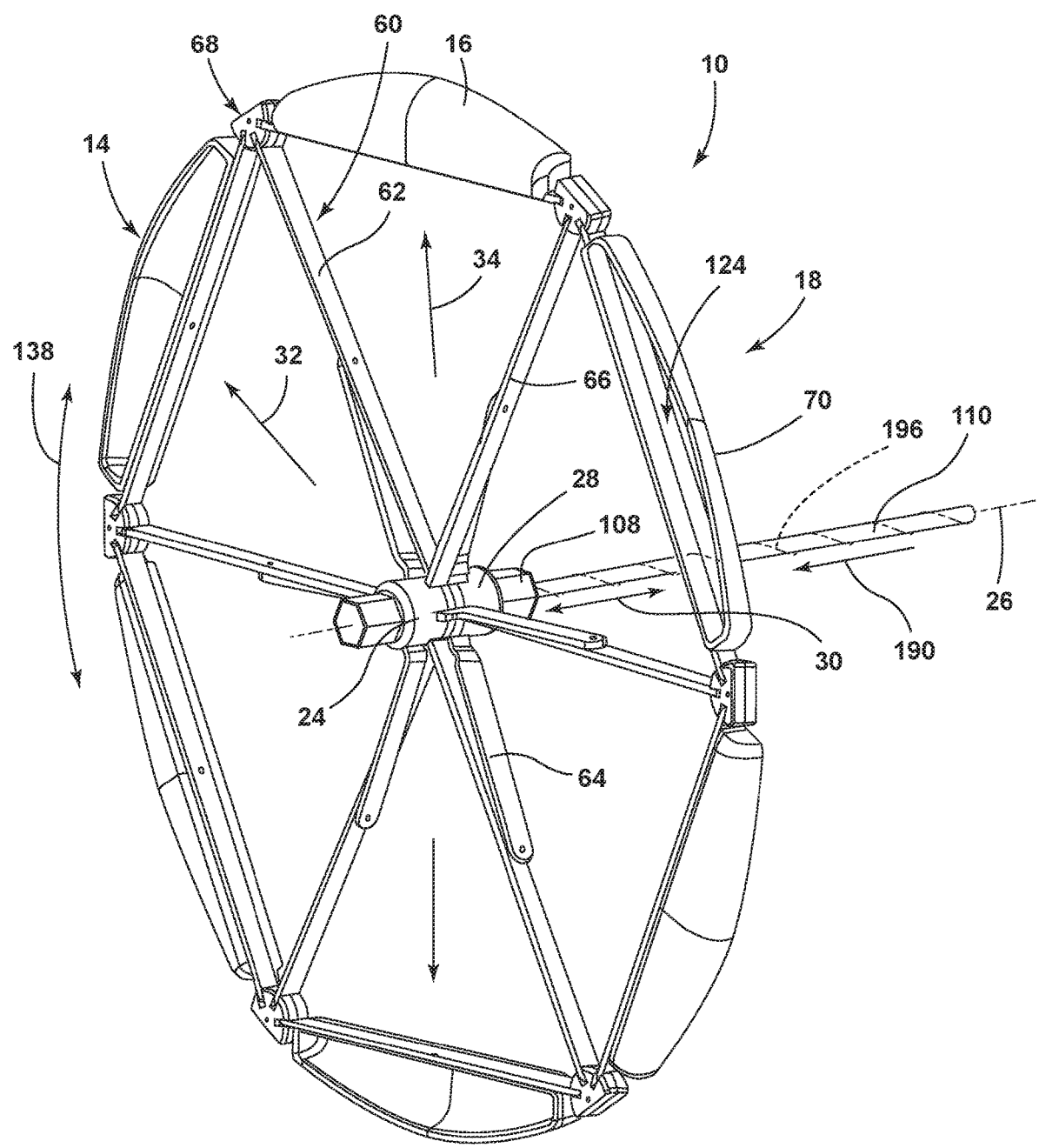
FIG. 5 is a perspective view of an aspect of the utility power generator shown in the planar position.

As exemplified in FIGS. 4 and 5, the flywheel 14 portions of the collapsible flywheel 14 can take different configurations and can include different flywheel attachments 120. As exemplified in FIG. 4, the flywheel 14 portions are generally linear members that extend between adjacent joints 68 of the plurality of joints 68 for the collapsible flywheel 14. As shown in FIG. 5, the fins 122, containers 126, and other flywheel attachments 120 can be linked to the individual flywheel portions 70 for adding various functionality to the collapsible flywheel 14. As exemplified in FIG. 5, the flywheel attachments 120 can be positioned forward as fins 122 or scoops 124 that can serve to better engage the moving media 80 such as wind 82 or moving water 84. Additionally, as exemplified in FIGS. 5 and 22, the flywheel 14 attachments can attach to the individual flywheel portions 70 as containers 126 that can be filled with water, powder, consumable materials, food items, and other similar materials. It is also contemplated that the containers 126 that can be attached to the flywheel portions 70 can serve as a ballast for providing greater inertia to the collapsible flywheel 14 when it rotates about the rotational axis 26.

Referring again to FIGS. 1-5, the utility power generator 10 can be attached to the rotational shaft 110, where the use of a rotational shaft 110 allows for better positioning of the axial fitting 28 in one of the sinusoidal positions 20. It is also contemplated that the rotational shaft 110 can be defined by an engagement between the hub 24 and the axial fitting 28 in the planar position 18. Additionally, a telescoping member can be defined between the hub 24 and the axial fitting 28 such that movement of the axial fitting 28 away from the hub 24 causes an extension of the telescoping mechanism that defines the rotational shaft 110 for the utility power generator 10.

It is contemplated that the transfer fitting 36 can attach to any one of the flywheel 14, the hub 24, the axial fitting 28 and where used, the rotational shaft 110 of the utility power generator 10. Rotation of the flywheel 14 serves to rotate at least the flywheel 14, the hub 24 and the axial fitting 28 so that this rotational energy 138 can be harnessed and used for operating a field tool 12, as will be described more fully below.

Figure 6:
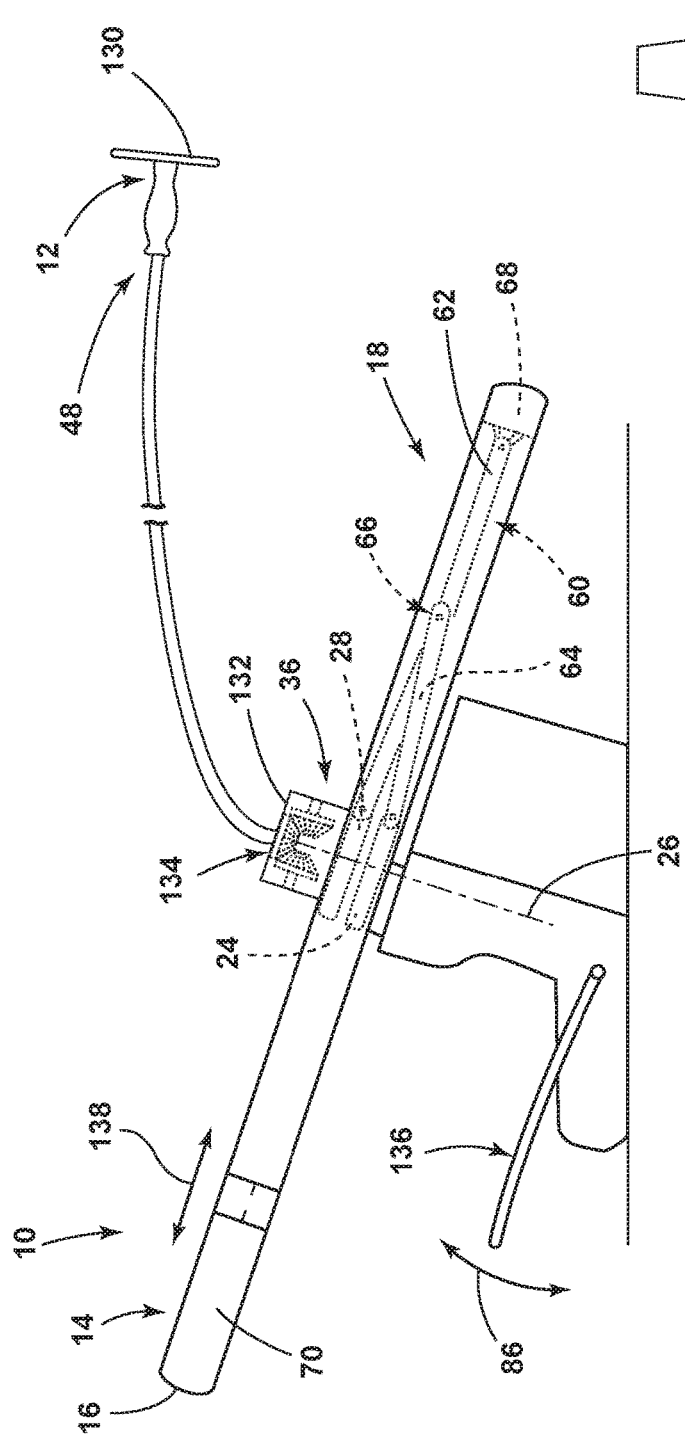
FIG. 6 is a schematic side elevational view of an aspect of the utility power generator shown used in conjunction with a cutting tool.
Figure 7:
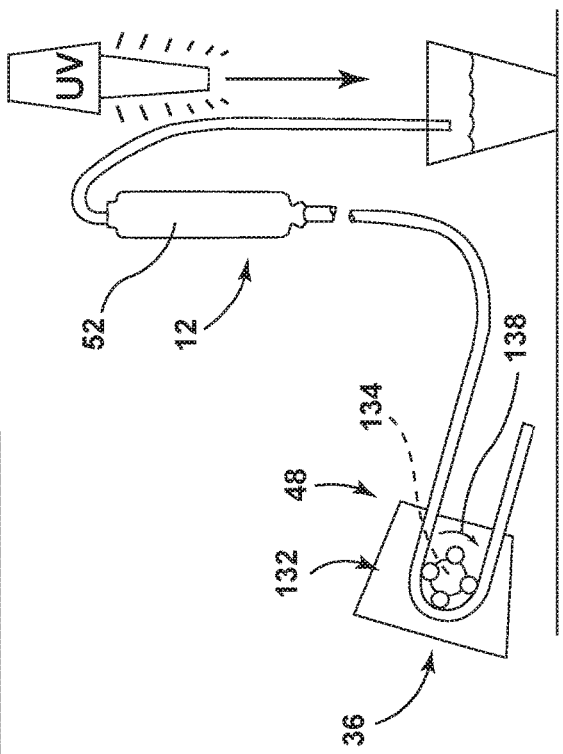
FIG. 7 is a side elevational view of an aspect of a water filtration device that can be used in conjunction with an aspect of the utility power generator.
Figure 9:
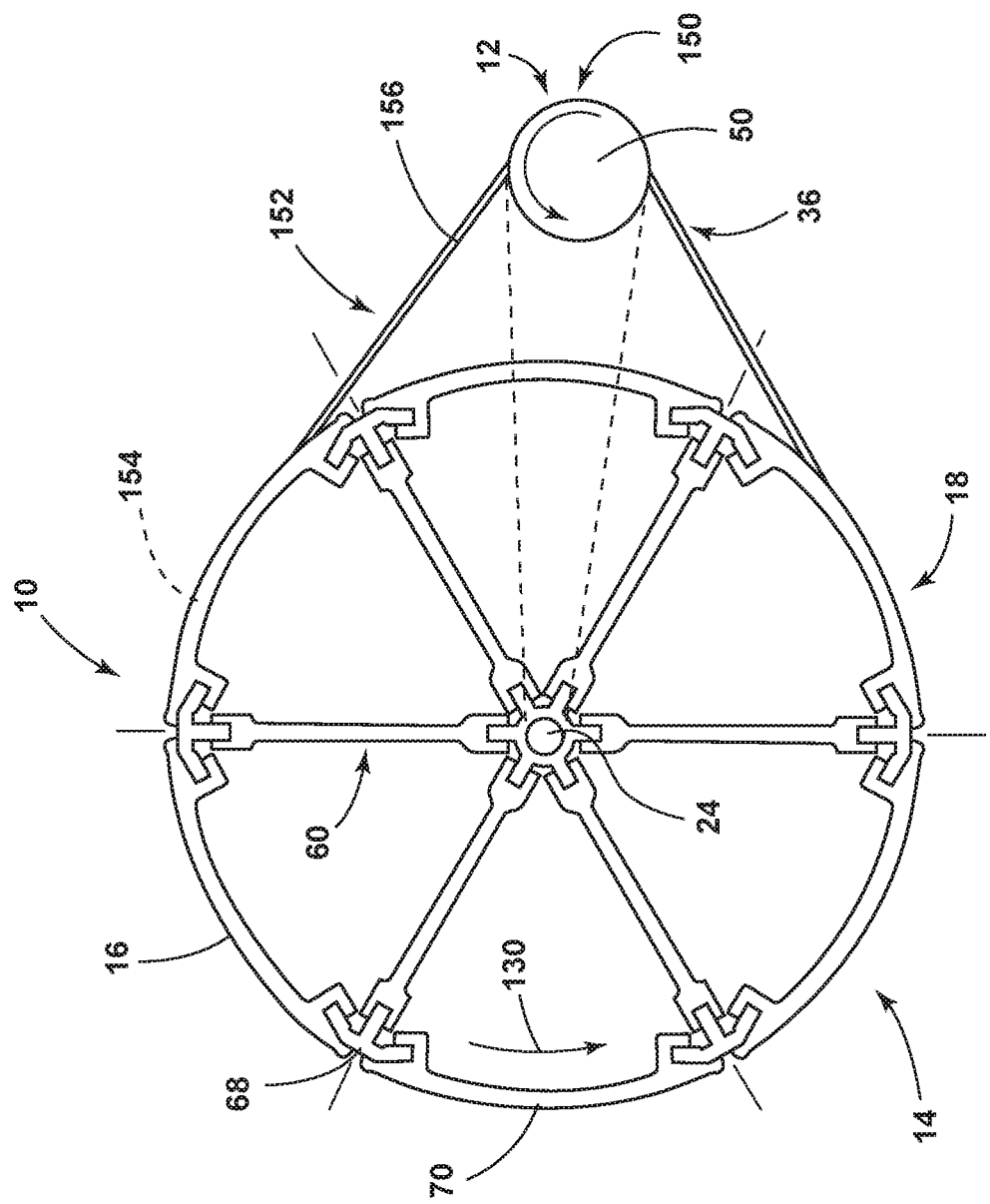
FIG. 9 is a side elevational view of the utility power generator of FIG. 8 showing a driving belt operable within the outer channel of the flywheel.
Figure 8:
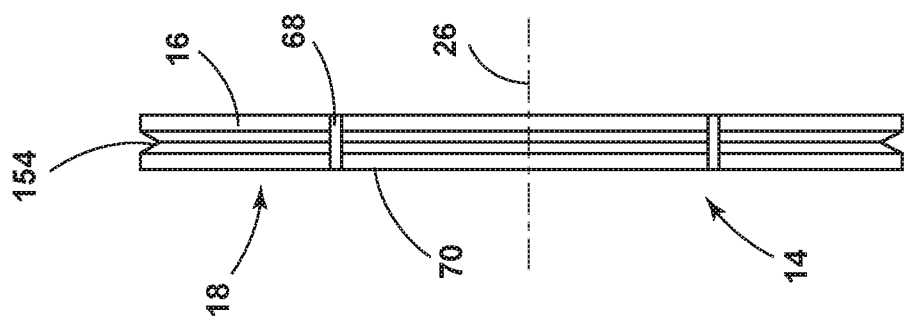
FIG. 8 is a side elevational view of an aspect of the utility power generator shown in a planar position and showing an outer channel that is configured to receive a driving belt for operating an aspect of the transfer fitting.

Referring now to FIGS. 6 and 7, the utility power generator 10 can include a transfer fitting 36 that allows for harnessing of the rotational movement of the collapsible flywheel 14 for operating a field tool 12 in the form of a cutting mechanism 130, as shown in FIG. 6. The transfer fitting 36 can take the form of a gearing mechanism 132 that can include a plurality of transfer outlets 134. Each of these transfer outlets 134 can connect with a different tool 12 for allowing for alternative or simultaneous operation while the collapsible flywheel 14 rotates about the rotational axis 26. It is contemplated that the collapsible flywheel 14 can be attached to a drive mechanism 184 that can be powered via a pedal 136 or hand-operated lever that can be operated for manually rotating the collapsible flywheel 14 about the rotational axis 26. The collapsible flywheel 14 can also be fitted with one or more flywheel attachments 120 that can serve to harness a moving media 80 such as wind 82 or moving water 84 or other body movement 86. As the flywheel 14 rotates, the transfer fitting 36 harnesses this rotational energy 138 of the flywheel 14 and can transfer this rotational energy 138 via the gearing mechanism 132 for operating one or more tools 12. As discussed above, these tools 12 can take the form of a cutting mechanism 130, a water pump, a water filter 52, a desalinization mechanism, an electrical generator, or other similar device, as is described herein. In order to increase the rotational energy 138 provided by the collapsible flywheel 14, the various flywheel attachments 120 that can be attached to the individual flywheel portions 70 can be filled with a ballast. Accordingly, as the flywheel 14 operates, the increased ballast that is attached to the individual flywheel 14 portions allows for greater momentum and greater rotational energy 138 for maintaining the collapsible flywheel 14 in a rotating state. The additional ballast may require additional input energy in the form of body movement 86, wind 82, moving water 84, gravity or other energy source for causing the collapsible flywheel 14 to rotate about the rotational axis 26. However, the increased ballast may also increase the output energy generated by the collapsible flywheel 14 for operating the tool 12.

As further exemplified in FIGS. 6 and 7, the field tool 12 can include various mechanisms that can be used in the field for recreation, military personnel out in the field, in conjunction with survival equipment and other similar uses. As exemplified in FIG. 7, one such tool 12 can include a water filter 52 that can be used in conjunction with a mechanical filter and an ultraviolet device for creating drinking water out of water that may be contaminated or otherwise unsafe for use or consumption.

Referring now to FIGS. 8-12, the transfer fitting 36 can take the form of a rotating mechanism 150 that can be engaged with an outer circumference or outer perimeter 16 of the collapsible flywheel 14. In such an embodiment, the transfer fitting 36 can take the form of a gear-reduction mechanism where rotational movement of the collapsible flywheel 14 is transferred to the transfer fitting 36 so that the speed of the collapsible flywheel 14 at its outer perimeter 16 can transfer to the transfer fitting 36. This transfer fitting 36 can then harness this rotational energy 138 from the collapsible flywheel 14 and transfer this rotational energy 138 for operating a field tool 12. As exemplified in FIGS. 8 and 9, the collapsible flywheel 14 in the planar position 18 can serve to define an outer channel 154 that is configured to receive a drive belt 156. Rotation of the collapsible flywheel 14 about the rotational axis 26, in turn, operates the transfer fitting 36 via the drive belt 156. As discussed above, in this configuration, the transfer fitting 36 serves as a gear reduction mechanism 152, whereby rotation of the collapsible flywheel 14 at a certain rate of rotations over time can be transferred to the transfer fitting 36 so that the transfer fitting 36 rotates at a higher rate due to the positioning of the drive belt 156 in relation to the transfer fitting 36.

In certain aspects of the device, the drive belt 156 and the outer channel 154 of the collapsible flywheel 14 can include mating cogs that can be used to prevent slippage of the drive belt 156 during operation of the collapsible flywheel 14 and the transfer fitting 36. Use of the transfer fitting 36 is attached to an outer perimeter 16 of the collapsible flywheel 14 is typically used for causing a higher rate of rotation of the tool 12. It is also contemplated that a drive belt 156 may be attached between the transfer fitting 36 and one of the hub 24 or the axial fitting 28. In such an embodiment, the drive belt 156 connected to the hub 24 or the axial fitting 28 may serve as a gear reduction mechanism 152 that decreases the rotational speed of the transfer fitting 36 but increases the torque provided to the transfer fitting 36 by rotation of the collapsible flywheel 14. According to various aspects of the device, the increase in rotational speed or the increase in torque may be alternatively used depending upon the tool 12 being connected to the transfer fitting 36 or the task being performed using the utility power generator 10, as described herein.

Figure 11:
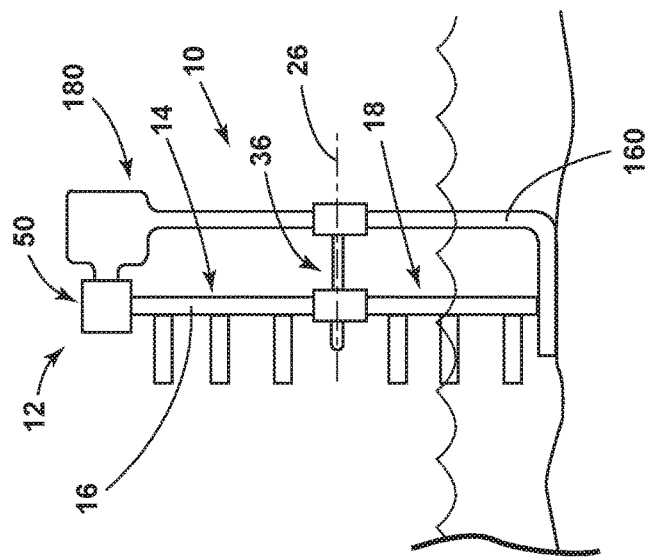
FIG. 11 is a side elevational view of the utility power generator of FIG. 10.
Figure 10:
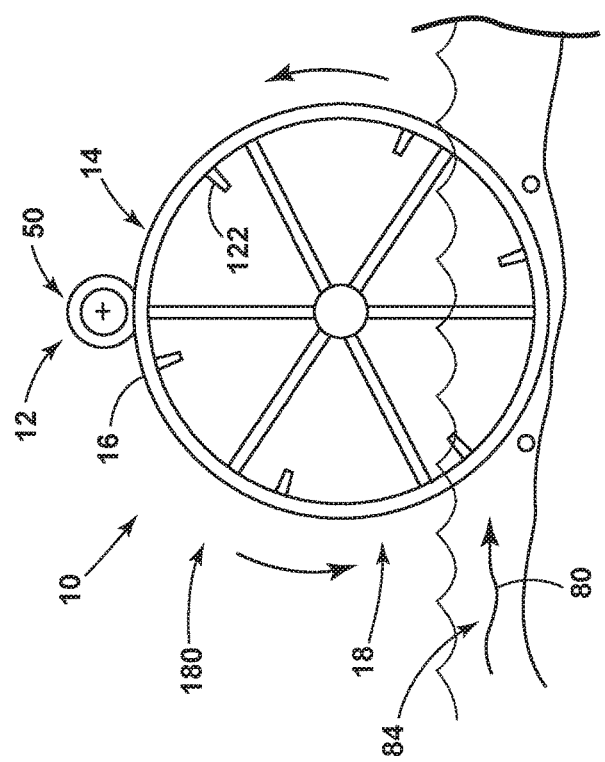
FIG. 10 is a side elevational view of an aspect of the utility power generator shown being used as a water-harnessing device.
Figure 12:
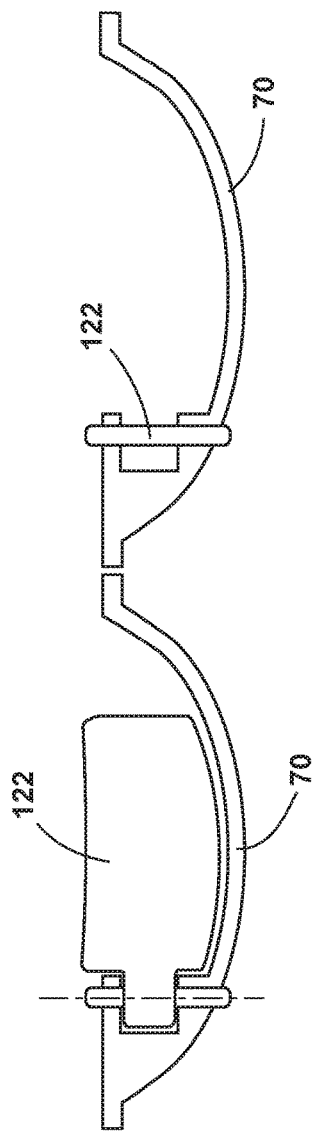
FIG. 12 is a side elevational view of an aspect of the flywheel for the utility power generator of FIG. 10 and showing individual flywheel portions having operable fins for harnessing a moving media.

As exemplified in FIGS. 10-12, the transfer fitting 36, in certain aspects of the device, can be coupled directly to an outer perimeter 16 of the collapsible flywheel 14. In such an embodiment, the flywheel portions 70 can include fins 122 that can be rotated outward to provide greater surface area for harnessing wind 82 or moving water 84. By moving the operable fins 122 in an outward direction 34, the collapsible flywheel 14 can take the form of a waterwheel 180 or wind wheel that can harness the moving media 80 for creating a rotation of the collapsible flywheel 14 that can be transferred to the transfer fitting 36 for operating the tool 12. The collapsible flywheel 14 can include a support structure 160 that maintains a position of the collapsible flywheel 14 within the moving media 80 and also maintains a position of the transfer fitting 36 with respect to the outer perimeter 16 of the collapsible flywheel 14. As with the collapsible flywheel 14, the structure can also be collapsed for easy storage and carrying during intermittent use in the field.

Referring now to FIGS. 13-16, the utility power generator 10 can include various flywheel 14 attachments that can be coupled with portions of the collapsible flywheel 14, the hub 24, the axial fitting 28 and the rotational shaft 110. As exemplified in FIG. 13, one or more sails 170 can be attached to the utility power generator 10 for harnessing wind 82 or the energy from moving water 84. It is also contemplated that the various flywheel portions 70 can include integral blades, scoops 124 or sails 170 that can be adapted to interact with the moving media 80.

Figure 13:
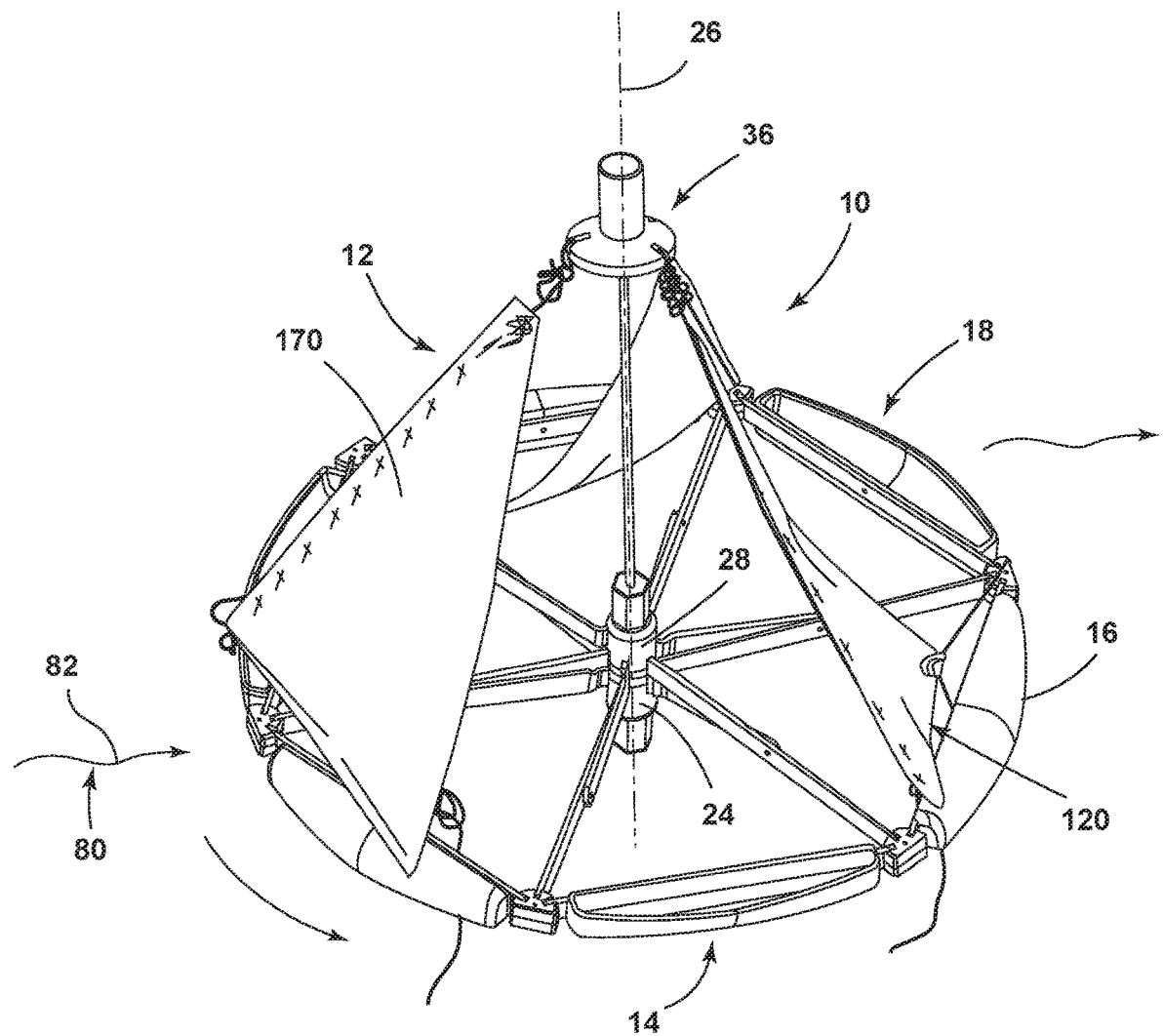
FIG. 13 is a top perspective view of an aspect of the utility power generator shown incorporating a plurality of sails for harnessing a moving media.
Figure 14:
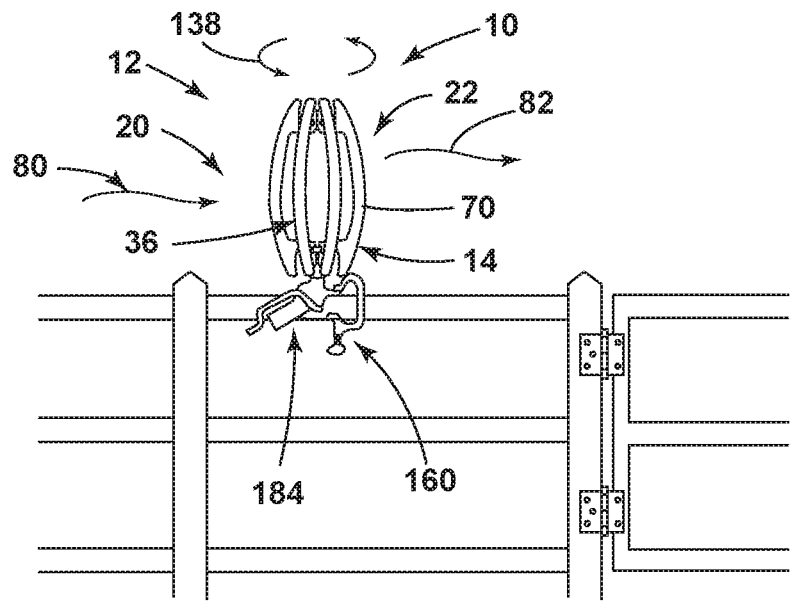
FIG. 14 is an elevational view of an aspect of the utility power generator shown in the collapsed position for harnessing a moving media.

As exemplified in FIG. 13, the individual flywheel 14 portions in the collapsed position 22 or one of the sinusoidal positions 20, can be oriented substantially parallel with the rotational axis 26 of the collapsible flywheel 14. In this position, the individual flywheel 14 portions can act as sails 170 or scoops 124 that can be used to harness a moving media 80 such as wind 82 or moving water 84. In this manner, the collapsible flywheel 14 and the utility power generator 10 can be used to passively harness the moving media 80 for generating rotational energy 138. This energy can then be transferred to the transfer fitting 36 for operating one of the tools 12. Where a passive capture of energy is being used, such as in FIGS. 13-16, the tool 12 can be in the form of an electric rotor 50, other electricity generating device or other tool 12 that can harness and also store this energy for later use. It is also contemplated that the tool 12 in this aspect of the device can be in the form of a light fixture, an electrical beacon, rechargeable battery, device recharger or other similar electricity harnessing and storage device.

Figure 15:
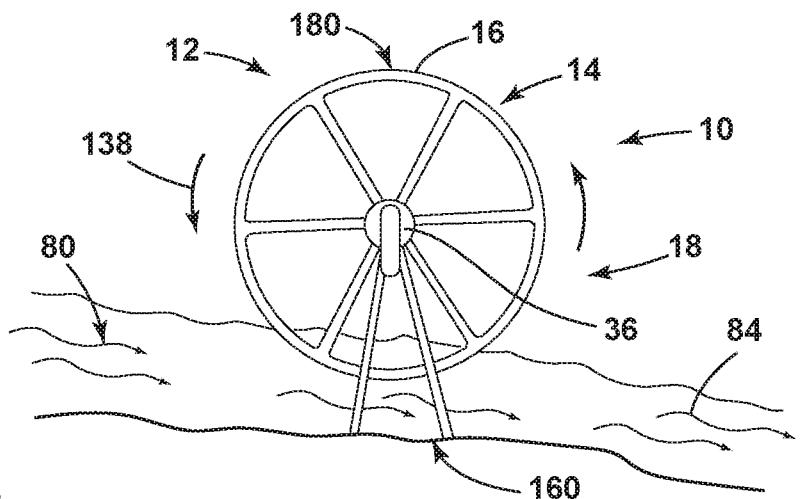
FIG. 15 is a side elevational view of an aspect of the utility power generator shown operating as a water wheel.
Figure 16:
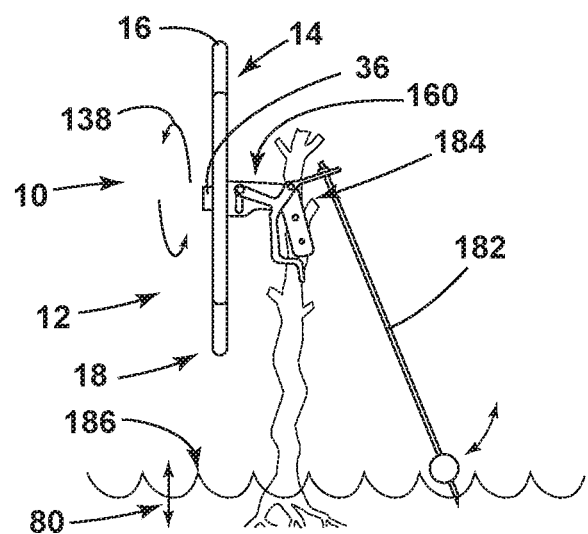
FIG. 16 is a side elevational view of an aspect of the utility power generator shown as used for harnessing wave movements.

As exemplified in FIGS. 15 and 16, the utility power generator 10 can be used in connection with the movement of water for causing the rotation of the collapsible flywheel 14. As exemplified in FIG. 15, the collapsible flywheel 14 can be used as a waterwheel 180 for causing rotation of the collapsible flywheel 14 for generating energy via the transfer fitting 36. It is also contemplated that wave energy can be harnessed. An oscillating linkage 182 can be attached to the drive mechanism 184. As the oscillating linkage 182 moves in connection with the waves 186 generated by the water, the drive mechanism 184 can be passively operated though the movement of the waves 186 to rotate the collapsible flywheel 14 about the rotational axis 26. As the collapsible flywheel 14 rotates about the rotational axis 26, this rotational energy 138 can be captured, harnessed, or otherwise stored for later use.

As discussed above, the collapsible flywheel 14 can include typically six individual flywheel portions 70. These adjacent flywheel portions 70 are rotationally linked and operable with respect to one another to define collapsed, sinusoidal and planar positions 22, 20, 18. In the planar position 18, the flywheel portions 70 are oriented generally perpendicular to the rotational axis 26. As the axial fitting 28 moves away from the hub 24, the flywheel 14 portions are moved into a more angular or oblique position with respect to the rotational axis 26. This movement of the axial fitting 28 serves to generate or define the various sinusoidal positions 20 of the collapsible flywheel 14. The positioning of the flywheel portions 70 in the various sinusoidal positions 20 can be used to harness different types of moving media 80 or can be used to better transfer the energy from the moving media 80 into the transfer fitting 36.

By way of example, and not limitation, certain aspects of the utility power generator 10 may be more efficient where the transfer fitting 36 is oriented parallel with the rotational axis 26 of the collapsible flywheel 14. In alternative conditions, the transfer fitting 36 may be better operated when oriented perpendicular to the rotational axis 26 of the flywheel 14. Each of these conditions may require a different position of the collapsible flywheel 14 between the planar position 18 and the plurality of sinusoidal positions 20. In the collapsed position 22, the flywheel portions 70 are oriented substantially parallel with the rotational axis 26. This orientation can be used for orienting the rotational axis 26 of the flywheel 14 in a configuration that is generally perpendicular to the movement of the moving media 80, as exemplified in FIG. 14.

According to various aspects of the device as exemplified in FIGS. 1-21, rotation of the flywheel 14 can cause a movement of the axial fitting 28 away from the planar position 18. This movement of the axial fitting 28 can define an axial force 190 that is exerted in the axial direction 30 and parallel to the rotational axis 26. In order to harness this axial force 190, the transfer fitting 36 can be coupled to the axial fitting 28. In such an embodiment, the axial force 190 can be configured to move an object or potentially launch a projectile in the axial direction 30 along the rotational axis 26. In this embodiment, rotation of the collapsible flywheel 14 about the rotational axis 26 tends to cause the axial fitting 28 to move toward the hub 24. As the collapsible flywheel 14 rotates, a user moving the axial fitting 28 away from the hub 24 is able to perceive an opposing force in the axial direction 30 that tends to cause the axial fitting 28 to operate towards the hub 24. As the flywheel 14 rotates faster about the rotational axis 26, the axial force 190 exerted by the axial fitting 28 in the axial direction 30 of the hub 24 also becomes greater. Where the collapsible flywheel 14 spins at a predetermined speed, the axial force 190 generated by the movement of the axial fitting 28 toward the hub 24 can be sufficient to cause a projectile to be launched in the axial direction 30 parallel with the rotational axis 26 of the flywheel 14.

In various aspects of the device, as exemplified in FIGS. 1-5, the rotational shaft 110 can include a helical surface 196 that can operate in conjunction with the axial fitting 28. In such an aspect of the device, as the axial fitting 28 is moved toward and/or away from the hub 24, engagement of the axial fitting 28 with the helical surface 196 of the rotational shaft 110 can result in a rotation of the collapsible flywheel 14 about the rotational axis 26. As the axial fitting 28 is moved more rapidly, the collapsible flywheel 14 is able to achieve greater rotational speeds about the rotational axis 26. As discussed above, as the collapsible flywheel 14 rotates faster, the axial force 190 exerted by the axial fitting 28 toward the hub 24 also increases. It can be perceived that this axial force 190 exerted by the axial fitting 28 could be sufficient enough to launch a projectile along the axial direction 30 and toward another location. Such a projectile can be used for launching a rope, launching a projectile at wild game, or other similar function where a projectile may be desired to be launched.

Referring now to FIGS. 17-21, according to various aspects of the device, the utility power generator 10 can be attached to a wearable member 210 or wearable garment 226 that can be worn by a user. The wearable member 210 can include oscillating linkages 182, such as body linkages, that can attach to various portions of the wearable member 210 for use in connection with various portions of the user's body. As the user walks, runs, or otherwise moves their limbs 212, the selective movement of the body linkages or the oscillating linkages 182 that are attached to the utility power generator 10 can move in conjunction with these body movements 86. These body movements 86 can be harnessed by the oscillating linkages 182 and transferred to the utility power generator 10 causing the collapsible flywheel 14 to rotate. Rotation of the collapsible flywheel 14 about the rotational axis 26 can be transferred to a transfer fitting 36 for harnessing this rotational energy 138 in the form of body movement 86 for harnessing, storing, or otherwise using this energy for operating a tool 12 or storing energy for later use.

As exemplified in FIGS. 17-20, the oscillating linkages 182 can extend to a user's arms 220 or legs 222. In such an embodiment, as a user walks, movement of the user's legs 222 and/or arms 220 can be harnessed by the oscillating linkages 182 and transferred to the collapsible flywheel 14 for rotation. It is contemplated that the oscillating linkages 182 can be in the form of external members 224 that may be visible and also stowable when not in use. It is also contemplated that the oscillating linkages 182 can be disposed, sewn, or otherwise integrated into a wearable garment 226. In such an embodiment, the sleeves 228 or pant legs 230 of the wearable garment 226 can be connected with the transfer fitting 36 of the collapsible flywheel 14. According to various aspects of the device, the collapsible flywheel 14 can include various guards or shields that can prevent the user from engaging the collapsible flywheel 14 as it rotates. Various shielding can also be used to prevent external items from falling into the flywheel 14 as it rotates.

In various aspects of the device, where the wearable member 210 or wearable garment 226 can be used to transfer body movements 86 to the collapsible flywheel 14, a plurality of collapsible flywheels 14 can be incorporated within the wearable member 210. By way of example, and not limitation, a separate collapsible flywheel 14 can be attached to each limb 212 such that at least four collapsible flywheels 14 can be integrated with the wearable member 210 and where each collapsible flywheel 14 is attached to a separate limb 212. Accordingly, movement of the user's right arm 220 can serve to rotate a dedicated collapsible flywheel 14 and so on with the user's left limb 212 and legs 222.

Figure 21:
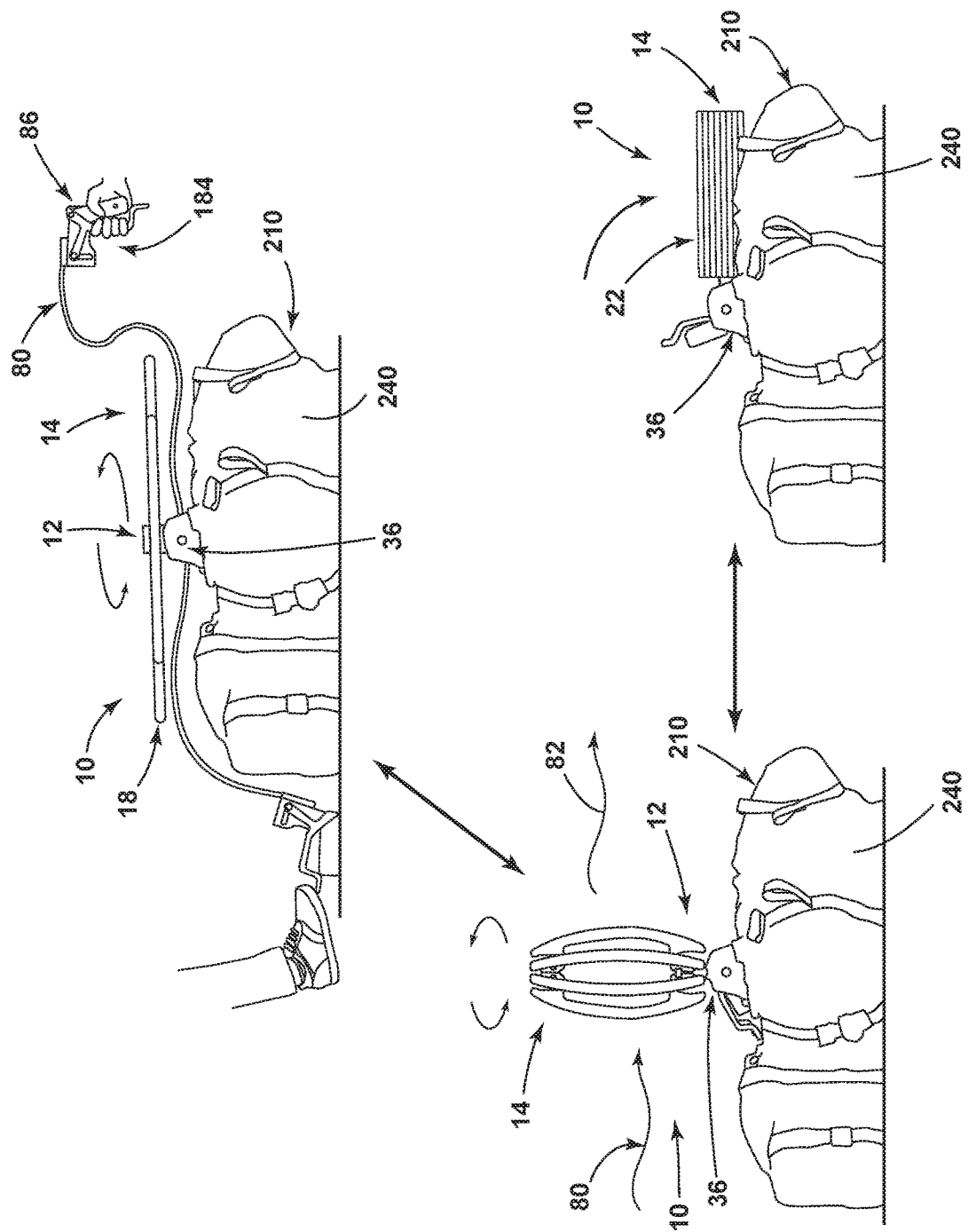
FIG. 21 is a series of schematic elevational views showing operation of the utility power generator of FIG. 17 showing use of the wearable member when not placed on a user's body.

According to various aspects of the device, as exemplified in FIG. 21, the wearable member 210 can be in the form of a pack 240 or other storage container 126 that can integrate an aspect of the utility power generator 10. In such an embodiment, the wearable member 210 can be used to harness body movements 86 when being worn by the user through the use of the oscillating linkages 182. Where the wearable member 210 is removed from the body, the collapsible flywheel 14 can be oriented in various configurations for use in harnessing a moving media 80 such as wind 82, water or other moving media 80. It is also contemplated that the collapsible flywheel 14 can be moved to the collapsed position 22 and stowed for later use.

According to various aspects of the device, as exemplified in FIGS. 1-22, the structure that forms the utility power generator 10 can vary depending upon the application within which the collapsible flywheel 14 is used. By way of example, and not limitation, flywheel portions 70 can be made as more robust members where the moving media 80 may be more forceful, such as running water, or body movements 86. It is also contemplated that the individual flywheel portion 70 can be more lightweight where the moving media 80 is wind 82 or slower moving water 84. Additionally, the flywheel 14 attachments to the individual flywheel portions 70 can also be used to change the rigidity or structural integrity of the various flywheel portions 70. By way of example, and not limitation, the flywheel attachments 120 to the flywheel portions 70 can be used to increase the structural integrity of the overall assembly of the collapsible flywheel 14. In such an embodiment, the collapsible flywheel 14 can be modified to be used for harnessing energy from wind 82 to harnessing a more powerful energy in the form of running water in a rapidly moving river.

Referring again to FIGS. 1-5, it is typical that a collapsible flywheel 14 includes six individual flywheel portions 70. In this configuration, the collapsible flywheel 14 can easily and conveniently operate between the planar position 18 and the plurality of sinusoidal positions 20. Each joint 68 that is positioned between adjacent flywheel portions 70 is adapted to allow for rotational movement of the spoke 60 and each adjacent flywheel portion 70 so that the collapsible flywheel 14 can be easily and conveniently moved between the planar position 18 and the plurality of sinusoidal positions 20. In order to lock the collapsible flywheel 14 in any particular position, each joint 68 may include a separate locking mechanism 108 that can serve to lock or maintain the collapsible flywheel 14 in a particular position. The locking mechanism 108 positioned within the joints 68 can be used in conditions where no rotational shaft 110 is present.

Figure 22:
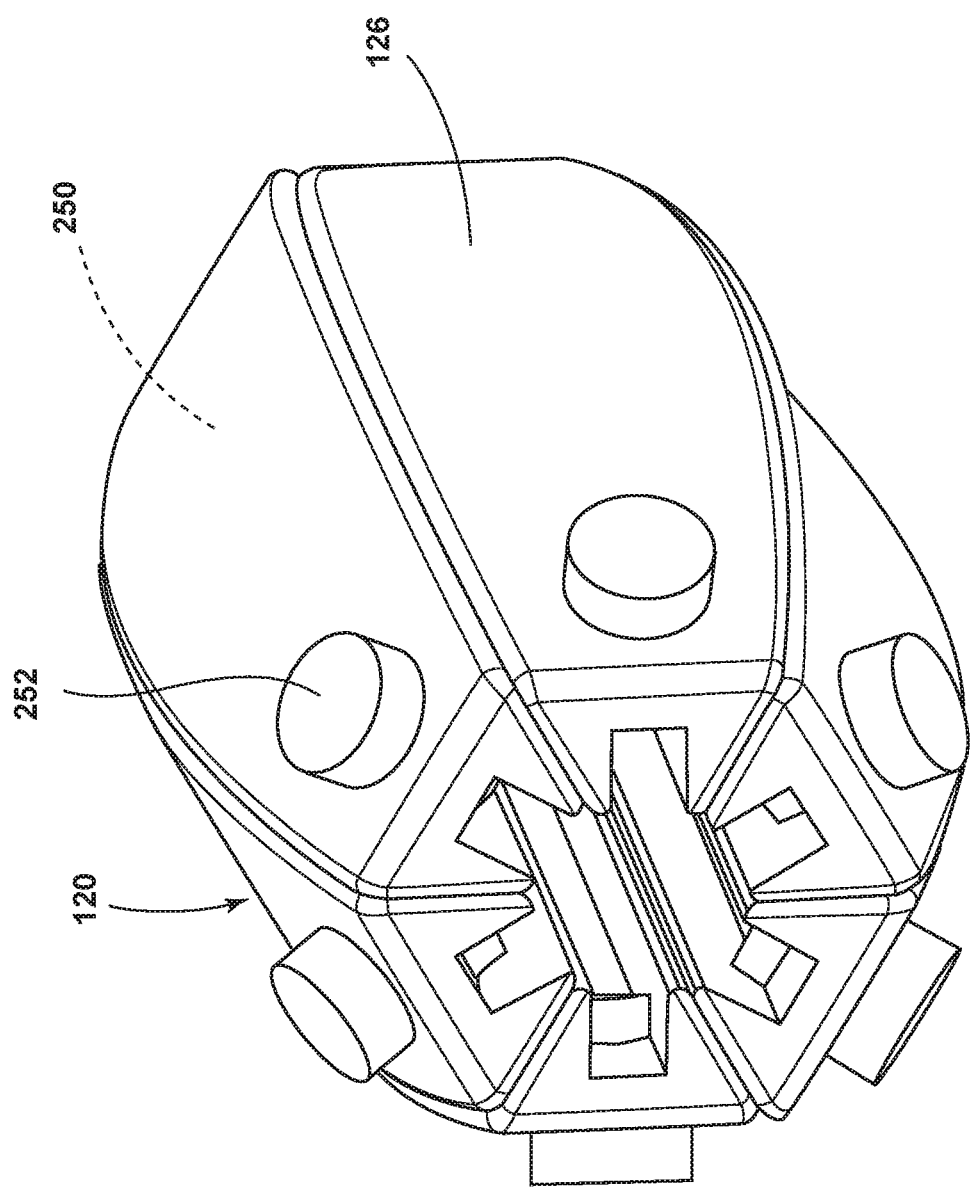
FIG. 22 is a top perspective view of an aspect of a plurality of flywheel portions that can be used as containers for holding a fluid media.
Figure 23:
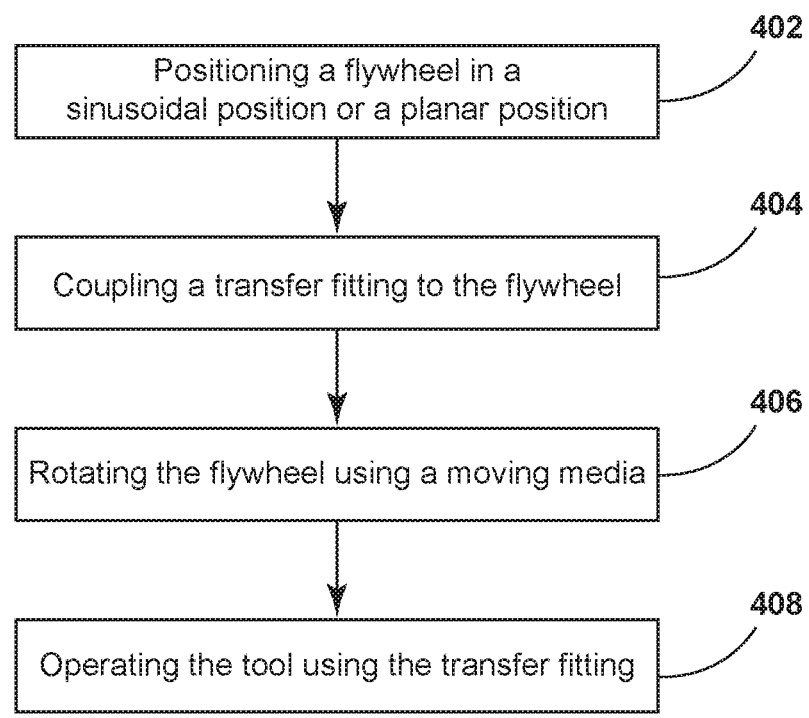
FIG. 23 is a schematic flow diagram illustrating a method for harnessing movement energy using a utility power generator.

Referring now to FIG. 22, it is contemplated that the flywheel attachments 120 for the individual flywheel portions 70 can include a container 126 or blade member that includes an interior volume 250. This container 126 can include a dedicated lid 252 that is operable to selectively access the interior volume 250 of the attachment for the flywheel portion 70. In such an embodiment, fluids, ballast, edible material, foodstuffs and other items can be disposed within the flywheel attachments 120 for the flywheel portions 70. As discussed above, the increase in ballast can serve to increase the inertia or momentum generated by the flywheel 14 as it moves about the rotational axis 26.

Referring now to FIGS. 1-23, having described various aspects of the utility power generator 10, a method 400 is disclosed for harnessing movement energy for operating a tool 12 using an aspect of the utility power generator 10. According to the method 400, a flywheel 14 is positioned in one of a sinusoidal position 20 and a planar position 18 (step 402). As discussed above, the position of the collapsible flywheel 14 can be set by operating the axial fitting 28 relative to the hub 24. This movement of the axial fitting 28 causes a sinusoidal formation to be formed between the various flywheel portions 70 of the collapsible flywheel 14. As discussed above, the flywheel 14, the hub 24 and the axial fitting 28 are adapted to rotate about a rotational axis 26. As the flywheel 14 rotates, the axial fitting 28 is tended to be biased toward the planar position 18. According to the method 400, a transfer fitting 36 is coupled to one of the flywheel 14, the hub 24 and the axial fitting 28 (step 404). The transfer fitting 36 is adapted to harness the rotational movement of the collapsible flywheel 14, the hub 24 or the axial fitting 28 and convert this rotational movement into work that can be done by a separate tool 12 or can be used to harness and store this energy for later use, such as within a battery or other electrical device. According to the method 400, the flywheel 14 is rotated by harnessing a moving media 80 (step 406). As discussed above, this moving media 80 can be at least one of wind 82, moving water 84, body movement 86 or combinations thereof. As discussed previously, rotation of the flywheel 14 causes a rotation of the transfer fitting 36. According to method 400, a field mechanism or field tool 12 is operated via the transfer fitting 36 (step 408). Rotation of the flywheel 14 serves to operate the field tool 12 via the transfer fitting 36.

According to various aspects of the device, the utility power generator 10 is used in connection with various moving media 80 for harnessing this movement and converting this movement into energy that can be used to power a tool 12 or store energy for later use. The utility power generator 10 is useful in the field where electrical power may not be available. The use of electrical power in the field is more and more needed for powering various technologies such as Global Positioning Systems (GPS), beacons, batteries, chargers, and other similar electrical devices. Power generation in a field setting is also useful for operating various mechanical devices 48 such as cutting tools, fluid pumps, fluid filters, desalinization mechanisms, air pumps, light fixtures, charging batteries, and other similar uses. Using the utility power generator 10 disclosed herein, a user can use this device for making an outdoor excursion more convenient. The user can also implement the utility power generator 10 as a survival mechanism for increasing the likelihood of rescue. Military personnel can also use the utility power generator 10 in the field for powering various devices and mechanisms useful for military personnel.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A utility power generator comprising:
    a flywheel that includes an outer perimeter that is operable between a planar position and a plurality of sinusoidal positions;
    a hub that is concentrically positioned within the flywheel, wherein the hub defines a rotational axis of the flywheel;
    an axial fitting that traverses relative to the hub and along the rotational axis in an axial direction as the flywheel operates between the planar position and the plurality of sinusoidal positions, wherein the flywheel, the hub and the axial fitting are rotationally linked to synchronously rotate about the rotational axis, and wherein rotation of the flywheel biases the axial fitting toward the planar position; and
    a transfer fitting coupled to at least one of the flywheel, the hub and the transfer fitting, wherein rotation of the flywheel about the rotational axis operates the transfer fitting to operate a tool.

2. The utility power generator of claim 1, wherein during rotation of the flywheel, movement of the axial fitting away from the planar position defines an axial force that is exerted parallel to the rotational axis.

3. The utility power generator of claim 2, wherein the transfer fitting is coupled to the axial fitting and wherein the axial force is configured to launch a projectile along the rotational axis.

4. The utility power generator of claim 1, wherein the transfer fitting is a rotationally operable tool that is configured to operate a working device, the working device including any one or more of the following:
    a water filter;
    an electrical generator;
    an air pump;
    a desalinization mechanism;
    a light fixture;
    an electrical beacon; and
    a cutting tool.

5. The utility power generator of claim 1, wherein the transfer fitting is coupled to an outer perimeter of the flywheel, and wherein rotation of the flywheel rotates the transfer fitting as a gear-reduction mechanism.

6. The utility power generator of claim 1, wherein the flywheel is coupled to a wearable garment and the transfer fitting includes body linkages that attach to portions of the wearable garment, wherein selective movement of the wearable garment transfers movement from the wearable garment to the transfer fitting to rotate the flywheel about the rotational axis.

7. The utility power generator of claim 5, wherein the flywheel in the planar position defines an outer channel that is configured to receive a driving belt, and wherein rotation of the flywheel about the rotational axis operates the transfer fitting via the driving belt.

8. A utility power generator comprising:
    a collapsible flywheel that is operable between a collapsed position, a sinusoidal position and a planar position;
    a rotational shaft extending at least partially through the collapsible flywheel and defining a rotational axis of the collapsible flywheel;
    an axial fitting that traverses along the rotational shaft in an axial direction as the collapsible flywheel operates between the collapsed, sinusoidal and planar positions; and
    a plurality of spokes that extend between the axial fitting and the collapsible flywheel, wherein rotation of the collapsible flywheel about the rotational axis, biases the axial fitting along the rotational shaft and toward the planar position.

9. The utility power generator of claim 8, wherein rotation of the collapsible flywheel about the rotational axis is accomplished by positioning the collapsible flywheel in one of the collapsed, sinusoidal and planar positions to selectively harness one of wind, moving water, gravity and body movement.

10. The utility power generator of claim 8, further comprising:
a hub that is axially fixed on the rotational shaft, wherein the collapsible flywheel, the hub and the axial fitting are rotationally linked to synchronously rotate about the rotational shaft.

11. The utility power generator of claim 10, wherein each spoke of the plurality of spokes includes a primary linkage that extends from the hub to the collapsible flywheel and a minor linkage that extends from the axial fitting to a medial portion of the primary linkage.

12. The utility power generator of claim 11, wherein the collapsible flywheel includes six individual flywheel portions, wherein adjacent flywheel portions are rotationally linked and operable with respect to one another to define the collapsed, sinusoidal and planar positions.

13. The utility power generator of claim 12, wherein the flywheel portions include blade members that are adapted to interact with a moving media.

14. The utility power generator of claim 13, wherein the moving media is at least one of moving water, current and wind.

15. The utility power generator of claim 13, wherein the blade members include an interior volume having a dedicated lid that is operable to selectively access the interior volume.

16. The utility power generator of claim 11, wherein the plurality of spokes engage the collapsible flywheel at rotational joints that are positioned between adjacent flywheel portions.

17. The utility power generator of claim 10, wherein the hub and the axial fitting are selectively linked to maintain the collapsible flywheel in the planar position.

18. The utility power generator of claim 8, wherein the rotational shaft is coupled to a transfer fitting, wherein rotation of the collapsible flywheel rotates the transfer fitting.

19. A method of harnessing movement energy for operating a tool positioning a flywheel having a hub and an axial fitting in one of a sinusoidal position and a planar position, wherein the flywheel, the hub and the axial fitting rotate about a rotational axis and the axial fitting is biased toward the planar position during rotation of the flywheel;
coupling a transfer fitting to one of the flywheel, the hub and the axial fitting;
rotating the flywheel by harnessing at least one of wind, water, gravity and body movement, wherein rotation of the flywheel causes a rotation of the transfer fitting; and
operating a field mechanism via the transfer fitting, wherein rotation of the flywheel operates a field tool.

20. The method of claim 19, wherein the flywheel, the hub and the axial fitting are coupled to a wearable member to harness body movement, wherein the body movement of a user wearing the wearable member is transferred via an input fitting to rotate the flywheel about the rotational axis, and wherein rotation of the flywheel operates the field tool via the transfer fitting, wherein the field tool includes any one or more of:
a water filter;
an electrical generator;
an air pump;
a desalinization mechanism;
a light fixture;
an electrical beacon; and
a cutting tool.

* * * * *